(12) United States Patent
Houck et al.

(10) Patent No.: US 7,476,430 B2
(45) Date of Patent: Jan. 13, 2009

(54) FLEXIBLE PAINT FOR WALLS AND CEILINGS

(75) Inventors: Merle Houck, Liberty, MO (US); Gerald Russo, Downers Grove, IL (US)

(73) Assignee: Roman Decorating Products, Inc., Calumet City, IL (US)

( * ) Notice: Subject to any disclaimer, the term of this patent is extended or adjusted under 35 U.S.C. 154(b) by 468 days.

(21) Appl. No.: 11/039,247

(22) Filed: Jan. 18, 2005

(65) Prior Publication Data

US 2006/0159908 A1    Jul. 20, 2006

(51) Int. Cl.
- *B32B 3/02* (2006.01)
- *B32B 13/00* (2006.01)
- *B32B 13/04* (2006.01)
- *B32B 13/12* (2006.01)
- *B32B 27/30* (2006.01)

(52) U.S. Cl. .............. 428/47; 428/44; 428/49; 428/57; 428/58; 428/522; 428/703; 428/323; 428/325; 428/330; 428/331; 52/79; 52/79.14; 52/390; 52/408; 52/410; 52/411; 52/412

(58) Field of Classification Search ............. None
See application file for complete search history.

(56) References Cited

U.S. PATENT DOCUMENTS

| | | | | |
|---|---|---|---|---|
| 3,708,935 A | | 1/1973 | Kossuth et al. | |
| 3,803,788 A | * | 4/1974 | Artmann | 52/417 |
| 3,816,199 A | | 6/1974 | Dawdy et al. | |
| 4,080,767 A | * | 3/1978 | Wilhelm | 52/314 |
| 4,146,672 A | * | 3/1979 | Jasperson | 428/332 |
| 4,164,598 A | * | 8/1979 | Wilhelm | 428/48 |
| 4,456,507 A | * | 6/1984 | Kivel et al. | 204/488 |
| 4,545,158 A | * | 10/1985 | Rizk | 52/79.1 |
| 4,545,159 A | * | 10/1985 | Rizk | 52/79.9 |
| 4,545,169 A | * | 10/1985 | Rizk | 52/601 |
| 4,620,404 A | * | 11/1986 | Rizk | 52/602 |
| 4,656,805 A | | 4/1987 | Winkowski | |
| 5,791,109 A | * | 8/1998 | Lehnert et al. | 52/309.17 |
| 6,018,919 A | | 2/2000 | Bodine | |
| 6,489,040 B1 | | 12/2002 | Rohlf et al. | |
| 2002/0045702 A1 | * | 4/2002 | Nakamura et al. | 524/801 |

\* cited by examiner

*Primary Examiner*—Vivian Chen
(74) *Attorney, Agent, or Firm*—Marshall, Gerstein & Borun LLP

(57) ABSTRACT

Wall and ceiling acrylic latex coating compositions having properties that prevent joints between adjacent wallboard panels from cracking during settling of new homes and during transportation of manufactured buildings, and otherwise prevents joint cracking from flexing, such as caused by extreme weather conditions or building settling. In another embodiment, the coating compositions can be applied directly over joints between adjacent square-edged wallboard panels to conceal the joint without using tape, wallboard "mud", or other joint filling compositions.

11 Claims, No Drawings

FLEXIBLE PAINT FOR WALLS AND CEILINGS

FIELD OF THE INVENTION

The present invention relates generally to improvements in the construction of walls and ceilings in buildings. The invention relates in particular to wall and ceiling structures for any building, particularly advantageous for manufactured buildings, and more particularly to wall and ceiling coating compositions having properties that prevent joints between adjacent wallboard panels from cracking during transportation of such manufactured buildings and otherwise prevents joint cracking from flexing, such as caused by extreme weather conditions. In another embodiment, the coating compositions described herein can be applied directly over joints between adjacent square-edged wallboard panels to conceal the joint without using tape, wallboard "mud", or other joint filling compositions.

BACKGROUND AND PRIOR ART

In building construction, adjacent panels are made co-planar by applying tape and a mud composition over the joint between the panels, with multiple mud applications and sanding steps. Even after this time-consuming process, building settling, after new building construction, frequently results in cracking of the dried mud at the panel joints as a result of panel flexing at the joints. The flexible paint compositions and methods described herein are capable of coating joint gaps between adjacent building panels, with or without the use of tape and mud, and the dry compositions flex rather than crack.

Modular buildings, also known as manufactured buildings, are constructed at least in part at a remote site. The entire building can be constructed at the production facility, and then moved to a permanent location where the building is positioned on a foundation. In other instances, components of the building, e.g. wall, floor or ceiling components, are manufactured at the remote site, and assembled at the final destination. This type of construction is widely used to construct residential buildings, commonly known as a mobile homes, or manufactured housing, as well as in other residential and commercial structures.

The wall structure conventionally used is constructed with a framework of vertical, spaced 2×4 wood studs or upright members, with horizontal cross bracing members. The framework members can also be of metal, e.g., steel.

A facing material, e.g., wallboard or gypsum board panels, is used to cover the interior surfaces of the framework, while a sheathing material, such as plywood, is used to cover the exterior of the framework. Joints between gypsum board panels are filled with tape and "mud" that is sanded to provide a planar surface of the wall.

A significant problem with manufactured building construction is that connection points between gypsum wall and ceiling panels of a manufactured housing wall or ceiling can become loosened by flexing during transport of the building, or during severe adverse weather conditions, resulting in outer surface cracking at gypsum board panel joints that require "field" gypsum board panel repair after transport, and often thereafter.

Thus, there is a need for improved manufactured gypsum board panel wall and ceiling structure that exhibits reduced cracking at joints as a result of wall and ceiling flexing during transportation or severe weather conditions, and a need for improved sheet rock coating materials for new home construction that reduces joint cracking as a result of building settling. A further need exists for coating compositions capable of directly coating and filling joints between adjacent gypsum board panels without first filling the joints with tape, mud and sanding the mud after drying.

Many prior art efforts at concealing the joint between manufactured building wallboard panels cover the joint with a fabric or film prior to coating. For example, U.S. Pat. No. 3,816,199 to Dawdy et al. discloses a concealed joint for the fastening of wallboard. The patent teaches pressing the edges of the sheet into joints formed between the panels and then inserting a decorative strip to hold the predecorated sheet edges in place in the joint. Similarly, U.S. Pat. No. 4,656,805 to Wenkowski discloses a paper batten for use in "concealing" the joints between predecorated gypsum wallboard. The batten is fabricated from predecorated wallboard paper with pressure-sensitive adhesive on the back thereof for securement over the joint. Unfortunately, it has been found that the paper battens tend to wrinkle and fall off. Moreover, the battens when in place are still noticeable and do not create the appearance of a monolithic or seamless wall.

In another method, a vinyl film or the like is adhered to only the major center portion of the wallboard front face. The wallboard is formed with tapered side edges so that abutting wallboards are secured to wall studs fasteners through the tapered side edge portions to which the vinyl covering is not adhered. Conventional joint compound (such as used in traditional gypsum wallboard joint filling) is then applied over the slight channel defined by the two abutting tapered wallboard side edge portions so as to conceal the fasteners and the joint. Once the joint compound has been allowed to cure, the unadhered edge flaps of the vinyl film attached to the center of the wallboard are trimmed to precisely fit adjacent flaps, and the flaps are glued to the surface of the dried joint compound. Such a system is described in U.S. Pat. No. 3,708,935 to Kossuth et al. Kossuth et al., however, use a tapered edge wallboard and the typical "mud system" for filling the channel between the sheets and the tapered area. However, a significant shortcoming is that this method requires considerable skilled labor to properly finish the joints. Other types of wallboard surface modifications are disclosed in U.S. Pat. Nos. 6,489,040 B1 and 5,791,109, including a shrinkable vinyl covering sheet to hide joints, as shown in U.S. Pat. No. 6,018,919.

The method of this invention for joining wallboard panels for walls and ceilings provides for a monolithic appearance using a viscous coating composition and eliminates the need for skilled labor to form the "seamless" joints between adjacent wallboard wall and ceiling panels, particularly useful in the construction of manufactured housing walls and ceilings. The compositions described herein are capable of filling joints between adjacent building panels, e.g., gypsum wallboard panels, without first taping over the joints and applying a mud composition over the tape.

SUMMARY

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Described herein is a composite wall and ceiling structure, and particularly a method and composition for covering a joint area between adjacent gypsum wall board panels that is capable of withstanding flexing forces occurring in manufactured housing construction and during transport, and after completion during severe weather conditions and/or building settling, prevalent in any new building construction, without crack formation at the joints between adjacent panels. In another embodiment of the invention, the coating compositions described herein can cover square-edged gypsum board panel joints to completely hide the joint without the use of tape and mud. Thus, wall joints can be covered and hidden with the compositions described herein in a single day. The compositions described herein are especially useful for wall finishing situations where the room being finished cannot accommodate the several day process associated with conventional tape and compound finishing. The invention is also useful for pre-construction of walls and ceilings for manufactured housing where transport cracks and reoccurring settling cracks are a problem. The coating compositions described herein act as a flexible membrane that allows for movement of adjacent gypsum board panels without sacrificing surface continuity.

This finishing system is ideal for manufactured housing applications because large wall sections can be finished in the factory and then survive subsequent transport and assembly.

In residential basement applications, the material may be applied directly over block walls, poured walls, old paneling and other common substrates to quickly transform the walls to smooth plaster looking walls.

The compositions described herein maintain sufficient flexibility after drying and sufficient texture to eliminate a gloss differential at wall joints where flexing may occur during transport of manufactured wall components or due to other stress conditions expected on joints of adjacent wall components. In addition, the coating compositions are sufficiently viscous that joints between adjacent wall components, such as square-edge gypsum wallboard panels, can be filled with the compositions while providing a planar outer surface without the typical tape and repeated mud applications and sanding usually required in the construction of gypsum board panel walls.

The compositions described herein include a resin polymer and/or resin copolymer, preferably an acrylic polymer or acrylic copolymer, as an emulsified water latex in an amount of at least about 15% by weight (active acrylic), preferably more than about 15% by weight, more preferably about 16-20%, and most preferably about 16-25% by weight, based on the total weight of the wet coating composition. The acrylic resin polymer and/or copolymer (hereinafter, referred to as "acrylic" or "acrylic polymer") provides a major portion of the required flexibility in the dried coating composition. A humectant, such as propylene glycol and/or ethylene glycol, preferably propylene glycol, is included in the coating compositions in an amount of at least about 1% by weight up to about 10% by weight, preferably about 1.1 to about 5% by weight, based on the total weight of the wet coating composition. Water is included in the compositions in an amount of about 10% to about 50% by weight of the wet composition, preferably about 30% to about 40% by weight. One or more thickeners, such as clay thickeners, cellulose thickeners, and/or polymer thickeners are included in the compositions in an amount sufficient to provide the compositions with a viscosity of at least about 50,000 cps, as measured by a Brookfield viscometer using spindle #7 at 20 rpm, preferably about 55,000-70,000 cps, more preferably about 55,000-60,000 cps. The compositions preferably have a density of about 10-15 gms/cc, a pH of about 7.5 to about 10, preferably about 8 to about 9. One or more organic or inorganic pigments and/or colorant compounds are included in the composition, such as lamp black; yellow iron oxide; red iron oxide; titanium dioxide; brown oxide; raw umber; burnt umber; phthalo blue; phthalo green; organic reds and organic yellows. A titanium dioxide pigment is preferred in order to provide a white composition. One or more dispersants and /or surfactants are included in the composition in an amount sufficient to maintain a homogenous emulsion, e.g. 0.01% about 1.0% by weight. One or more bactericides and/or fungicides preferably are included in the compositions for shelf life.

In the preferred embodiment, the composition includes one or more fillers having a particle size in the range of about 5 μm to about 100 μm. The filler(s) provide the dried coating composition with a textured surface for a more aesthetic, architectural appearance. In the preferred embodiment, the filler is included in an amount of about 10% to about 55% by weight of the wet coating composition, preferably about 30% to about 40% by weight. It has been found that excellent textured surfaces are provided by a combination of a majority of a calcium carbonate filler, e.g., about 30% to about 50% calcium carbonate, and 1% to about 10%, preferably about 2% to about 4% by weight feldspar filler. The preferred particle size for the calcium carbonate filler is about 8 μm to about 100 μm, more preferably about 12 μm to about 30 μm. The preferred particle size for the feldspar filler is about 5 μm to about 20 μm, more preferably about 10 μm to about 15 μm.

Suitable water-insoluble polymers and copolymers include the cross-linked polymers and copolymers of acrylic or methacrylic acid, for example, acrylic acid, the alkali metal and ammonium salts of acrylic acid, methacrylic acid, the alkali metal and ammonium salts of acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted aminoalkyl esters of either acrylic or methacrylic acids, alkyl acrylates, alkyl methacrylates, and copolymers with acrylic acid, methacrylic acid, acrylamide, and/or methacrylamide. Additional suitable copolymers include vinyl acetate-ethylene (VAE) and ethylene-vinyl chloride (EVCL).

An example of the compositions is included below together with percentage ranges and preferred ranges for the components contained in the composition suitable for mixing 100 gallons of the preferred, textured coating composition.

| Ingredient | Purpose | Pounds | % | % Range | Preferred % Range |
| --- | --- | --- | --- | --- | --- |
| water | solvent | 194 | 16.1 | 10 to 25 | 15 to 20 |
| propylene glycol | humectant | 15.5 | 1.3 | 1 to 10 | 1.1 to 5 |
| Foamaster SA-3 | defoamer | 3.5 | 0.3 | 0 to 1 | 0.1 to 0.5 |
| Tego KL245* | surfactant | 0.7 | 0.06 | 0.01 to 1.0 | 0.03 to 0.08 |
| Tego Dispers 651** | dispersant | 1.2 | 0.1 | 0.05 to 1.0 | 0.05 to 0.2 |
| Minex 2 | filler-feldspar | 40.8 | 3.39 | 0 to 10 | 1 to 4 |

-continued

| Ingredient | Purpose | Pounds | % | % Range | Preferred % Range |
|---|---|---|---|---|---|
| ATTAGEL 50*** | clay thickener | 10 | 0.83 | 0 to 2 | 0.5 to 1.0 |
| titanium dioxide | white pigment | 35.3 | 2.9 | 0 to 10 | 1 to 4 |
| calcium carbonate | filler, 12 micron | 470 | 39 | 0 to 50 | 35 to 45 |
| Mix 20 min and add: | | | | | |
| Natrosol 250 HBR | cellulose thickener | 4.6 | 0.38 | 0 to 2 | 0.1 to 1.0 |
| mixed with water | | 15.0 | 1.24 | 0 to 6 | 0.3 to 1.5 |
| Mix 20 min and add: | | | | | |
| BASE ACRONAL 120 | acrylic polymer emulsion 50% acrylic in water | 374 | 31.0 | 25 to 50 | 30 to 35 |
| TEXANOL**** | coalescent solvent | 24.2 | 2.0 | 0 to 10 | 1 to 5 |
| ACRYSOL TT-935 | HASE thickener | 6 | 0.5 | 0 to 5 | 0.1 to 1.0 |
| mixed with water | | 6 | 0.5 | 0 to 5 | 0.1 to 1.0 |
| Troy 192 | bactericide | 2.6 | 0.2 | 0.05 to 5.0 | 0.2 to 0.35 |
| Troy AF-1 | fungicide | 2.42 | 0.2 | 0.05 to 5.0 | 0.1 to 0.5 |
| | | 1201.6 | 100 | | |

*polyether siloxane copolymer
**polyether (30% active in water)
***Attapulgite clay thickener
****2,2,4-Trimethyl-1,3-pentane diol Monoisobutyrate The size of the acrylic particles in the acrylic latex emulsion should be in the range of about 0.05 μm to about 0.3 μm, preferably about 0.2 μm to about 0.3 μm.

Suitable water insoluble acrylic polymers and copolymers are the cross-linked polymers of acrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides of acrylic acid and/or methacrylic acid; the aminoalkyl acrylates, the aminoalkyl methacrylamides and the N-alkyl substituted aminoalkyl esters of either acrylic or methacrylic acids. These polymers may be the homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole percent of the acrylic or methacrylic acid derivatives, are preferred. Polymers of this type may be prepared directly by the polymerization of suitable monomers, or by the after chemical reaction of other polymers, for example, by the hydrolysis of acrylonitrile or methacrylonitrile polymers.

Other suitable acrylic polymers and copolymers are polymerized from one or more of the following acrylic monomers: methyl acrylate, ethyl acrylate, propyl acrylate, isopropyl acrylate, n-butyl acrylate, sec-butyl acrylate, isobutyl acrylate, tert-butyl acrylate, hexyl acrylate, heptyl acrylate, 2-heptyl acrylate, 2-ethylhexyl acrylate, 2-ethylbutyl acrylate, dodecyl acrylate, hexadecyl acrylate, 2-ethoxyethyl acrylate, isobornyl acrylate, and/or cyclohexyl acrylate.

Suitable commercially available examples are sold as emulsified 50% acrylic solids in water, such as BASF ACRONAL Optive 120, or BASF ACRONAL Optive 230 Architectural coatings all-acrylic latex polymer. ACRONAL Optive 120 is preferred.

The latex coating composition components can be mixed together in any manner that produces a homogeneous emulsion. The preferred method of manufacturing the latex composition is to form an emulsified mixture of water; one or more humectants, e.g., propylene glycol; a portion of the thickener, such as a clay thickener; filler; pigment; and optionally a dispersant. Another portion of a thickener, preferably a cellulose thickener, then is added to the emulsion to increase the viscosity of the composition to a doughy consistency to aid in dispersing the pigments and fillers. The acrylic polymer latex emulsion then is added to thin the mixture. The latex emulsion is purchased as an emulsion containing about 50% by weight acrylic polymer solids. Additional thickener then is added to achieve a viscosity in the final composition in the range of about 50,000 cps to about 70,000 cps, as measured by a Brookfield viscometer, spindle #7 at 20 rpm. A bactericide and a fungicide can be added at any stage of the mixing process, preferably last. If necessary a coalescent solvent should be added together with the acrylic polymer, if needed for film forming.

In the preferred embodiment, the dry composition includes at least 20% by weight acrylic polymer solids, preferably about 20-30% by weight acrylic polymer solids, and at least about 1% humectant, such as a glycol, e.g., ethylene glycol or propylene glycol, to maintain flexibility sufficient to prevent cracking when adjacent gypsum board panels are flexed after applying thereover a continuous coating of the compositions described herein, and after drying. The coated composition should have a thickness in the range of about 0.010 to about 0.050, preferably about 0.015 to about 0.030, after drying.

The invention claimed is:

1. A wall or ceiling comprising a plurality of aligned support structures having outer, planar support surfaces that lie in a common plane, and a plurality of wall or ceiling panels, each having a planar outer surface, secured to the support structures, adjacent one another, to provide a planar wall or ceiling surface, each wall or ceiling panel having a squared outer edge adjacent to an outer edge of an adjacent panel to minimize space between said adjacent outer edges of said adjacent wall or ceiling panels; and a coating composition, having a viscosity of at least 50,000 cps, comprising 10-15% by wt. water; 1-10% by wt. humectant; 0.01-5% by wt. dispersant; 30-50% by wt. calcium carbonate and 1-4% by wt. feldspar fillers having a particle size of about 5 μm to about 100 μm and 16-25% by weight acrylic polymer or acrylic copolymer, applied as a continuous coating over the wall or ceiling panels and over said space between adjacent panels to provide a continuous, planar outer surface coating on said wall or ceiling panels, without a visible joint between said adjacent panels after said coating composition has dried, and without applying a joint compound or tape over said space between said adjacent panels.

2. The wall or ceiling of claim 1, wherein the wall or ceiling is a manufactured wall or a manufactured ceiling.

3. The manufactured wall or ceiling of claim 2, wherein the coating composition further includes a thickener in an amount sufficient to provide the composition with a viscosity of 50,000 to 60,000 cps as measured by a Brookfield viscometer, spindle #7 @20 rpm.

4. The manufactured wall or ceiling of claim 3, wherein the thickener is selected from the group consisting of a cellulose thickener, a clay thickener, a polymeric thickener, and a combination thereof.

5. The manufactured wall or ceiling of claim 1, wherein the wall or ceiling panels are gypsum wall board panels.

6. The manufactured wall or ceiling of claim 1, further including a solid filler having a particle size in the range of about 5 μm to about 100 μm to provide a textured surface to said coating composition after said coating composition is dry.

7. A method of manufacturing a wall or ceiling comprising:
securing a plurality of wall or ceiling panels, each having a planar outer surface, adjacent to each other on a support structure such that the outer surfaces of the adjacent wall or ceiling panels lie in the same plane; and
applying a continuous layer of a latex coating composition over the adjacent wall or ceiling panels, said coating composition comprising 10-15% by wt. water; 1-10% by wt. humectant; 0.01-5% by wt. dispersant; 30-50% by wt. calcium carbonate and 1-4% by wt. feldspar fillers having a particle size of about 5 μm to about 100 μm; and 16-25% by weight acrylic polymer or acrylic copolymer while covering spaces between said adjacent panels with said latex coating composition, to provide a continuous, planar outer surface on said wall or ceiling panels, without a visible joint between adjacent panels after said coating composition has dried, and without applying a joint compound or tape over said spaces between said adjacent panels.

8. The method of claim 7, wherein the wall or ceiling is a manufactured wall or a manufactured ceiling.

9. The method of claim 8, wherein the coating composition further includes a thickener in an amount sufficient to provide the composition with a viscosity of 50,000 to 60,000 cps as measured by a Brookfield viscometer, spindle #7@20 rpm.

10. The method of claim 9, wherein the thickener is selected from the group consisting of a cellulose thickener, a clay thickener, a polymeric thickener, and a combination thereof.

11. The method of claim 7, wherein the wall or ceiling panels are gypsum wall board panels.

\* \* \* \* \*